United States Patent
Franke et al.

(10) Patent No.: US 11,286,211 B2
(45) Date of Patent: Mar. 29, 2022

(54) SETTING AND HARDENING ACCELERATOR FOR A CEMENT, MORTAR OR CONCRETE COMPOSITION, OPTIONALLY COMPRISING SUPPLEMENTARY CEMENTITIOUS MATERIALS, AND USE OF THIS ACCELERATOR

(71) Applicant: YARA INTERNATIONAL ASA, Oslo (NO)

(72) Inventors: Wolfram Franke, Porsgrunn (NO); Hilde Thommesen, Stathelle (NO)

(73) Assignee: YARA INTERNATIONAL ASA, Oslo (NO)

( * ) Notice: Subject to any disclaimer, the term of this patent is extended or adjusted under 35 U.S.C. 154(b) by 10 days.

(21) Appl. No.: 16/978,163

(22) PCT Filed: Mar. 5, 2019

(86) PCT No.: PCT/EP2019/055418
§ 371 (c)(1),
(2) Date: Sep. 3, 2020

(87) PCT Pub. No.: WO2019/170657
PCT Pub. Date: Sep. 12, 2019

(65) Prior Publication Data
US 2021/0040001 A1 Feb. 11, 2021

(30) Foreign Application Priority Data
Mar. 5, 2018 (EP) ..................... 18160001

(51) Int. Cl.
| C04B 40/00 | (2006.01) |
| C04B 22/06 | (2006.01) |
| C04B 22/08 | (2006.01) |
| C04B 28/04 | (2006.01) |
| C04B 28/08 | (2006.01) |
| C04B 28/14 | (2006.01) |
| C04B 103/12 | (2006.01) |
| C04B 103/14 | (2006.01) |

(52) U.S. Cl.
CPC ........ *C04B 40/0039* (2013.01); *C04B 22/062* (2013.01); *C04B 22/064* (2013.01); *C04B 22/085* (2013.01); *C04B 28/04* (2013.01); *C04B 28/08* (2013.01); *C04B 28/14* (2013.01); *C04B 2103/12* (2013.01); *C04B 2103/14* (2013.01)

(58) Field of Classification Search
CPC ... C04B 22/062; C04B 22/064; C04B 22/085; C04B 28/04; C04B 28/08; C04B 28/14; C04B 40/0039; C04B 2103/12; C04B 2103/14
See application file for complete search history.

(56) References Cited

U.S. PATENT DOCUMENTS

| 2012/0252653 A1 | 10/2012 | Rodrigues-Schroer et al. |
| 2014/0033954 A1* | 2/2014 | Flatt .................... C04B 40/0042 106/815 |

FOREIGN PATENT DOCUMENTS

| DE | 3543874 A1 | 6/1987 |
| GB | 2074993 A | 11/1981 |
| JP | 2005047735 A * | 2/2005 ......... C04B 40/0039 |

OTHER PUBLICATIONS

International Search Report and Written Opinion Issued in International Application No. PCT/EP2019/055418, dated Jun. 27, 2019, 11 pages.

* cited by examiner

*Primary Examiner* — Anthony J Green
(74) *Attorney, Agent, or Firm* — Dilworth IP, LLC

(57) ABSTRACT

The present application relates to a setting and hardening accelerator for a cement, mortar or concrete composition, optionally comprising cement replacement materials (CSMs). The accelerator composition comprises an aqueous nitrate solution and an alkaline hydroxide. Particularly, the aqueous accelerator composition comprises between 30 and 55 w/w % of a nitrate salt as a nitrate solution and between 0.02 and 0.1 w/w % of an alkaline hydroxide, which is dissolved in the nitrate solution and, optionally, as a hydroxide precipitate in the accelerator composition, wherein the accelerator composition has a pH of at least 9.0. In case the cement, mortar or concrete composition comprises CSMs, the accelerator composition has a pH of at least 12.0. The application furthermore relates to the use of the accelerator composition according to the present application and to a method for accelerating a cement, mortar or concrete composition by reacting the composition with the accelerator according to the application, in particular at cold temperatures.

13 Claims, 2 Drawing Sheets

SETTING AND HARDENING ACCELERATOR FOR A CEMENT, MORTAR OR CONCRETE COMPOSITION, OPTIONALLY COMPRISING SUPPLEMENTARY CEMENTITIOUS MATERIALS, AND USE OF THIS ACCELERATOR

FIELD OF THE APPLICATION

This application relates to setting and hardening acceleration of cement, mortar and concrete compositions. The cement, mortar or concrete composition optionally comprises one or more cement cementitious supplementary material (CSMs).

BACKGROUND

Since cement hydration is a slow process, there is a need for acceleration of setting and hardening to speed up the construction processes. Especially, there is a need to speed up work processes applying fresh concrete, what is economically interesting. Besides setting and hardening acceleration in cold climates, the setting and hardening acceleration is essential to counteract the cooling of concrete by the environment.

Calcium chloride ($CaCl_2$) is a possible accelerator for the setting of concrete, but it stimulates continuous oxidation of ferrous structural or reinforcing steel or aluminium conduits embedded in the concrete. $CaCl_2$ furthermore adversely influences the concrete itself, resulting in splintering and weakening. Where the concrete is in contact with moist soil, the attack of sulphates in the soil is enhanced by the $CaCl_2$. As a result, even where there is no metal in the concrete or corrosion of metal in the concrete is not a serious problem, there is a maximum of the amount of $CaCl_2$ that can be added to cement, mortar or concrete compositions. Although $CaCl_2$ has a low cost, the problems associated with its use bias its desirability in reinforced concrete construction.

Neutral or acidic calcium nitrate ($Ca(NO_3)_2$) is a common setting accelerator for concrete. It is usually added in the form of a solution after the concrete blend has been mixed with water. Usually 1% to 2% calcium nitrate needs to be added by weight of cement (=bwoc). Calcium nitrate does not provoke any corrosion when applied up to the level approved by European or ASTM admixture standards of 4% and 5% by weight respectively. However, the accelerating effect is based upon the ability of calcium nitrate to generate calcium hydroxide in order to rise the pH value and the calcium nitrate has a pH value of only 5-8. Consequently, the accelerating effect under cold climates is not sufficient and, in order to achieve faster acceleration, $CaCl_2$ is commonly added which presents the corrosion issues described in the previous paragraph.

U.S. Pat. No. 4,897,120 describes an accelerator for Portland cement derived from a fertilizer. More in particular, it relates to a method of chemically changing a composition of calcium nitrate containing ammonium nitrate, which has formerly been used as a fertilizer or an additive therefor, to make it usable as an additive for Portland cement concrete and mortars. In this method, a calcium ammonium nitrate composition is reacted with a tri- or tetramethylolglycoluril compound under alkaline conditions of pH, from about 7.5 up, preferably at a pH range between about 9 to 11. The presence of hexamine (urotropin) was found to have a favourable effect, not only on converting a calcium ammonium nitrate hydrate composition for use as a Portland cement accelerator, but also favourably affected the performance in that a quicker time of set was produced, with higher compressive strength performance. The resulting setting accelerator is suitable for applications in cold weather conditions.

Another way to improve the setting acceleration of calcium nitrate is to use polyethanolamine accelerators in combination with calcium nitrate. WO1982004038 relates to an additive composition which accelerates the setting time, and also improves the compressive strength of Portland type cement, mortars and concretes, more in particular for concretes which are to contain metal reinforcement. The additive composition consists essentially of a concentrated aqueous solution of calcium nitrate, and a waste by-product stream of a mixture of polyethanolamines to which a solution of an alkali metal or alkaline earth metal salt of a polyhydroxy aliphatic compound such a gluconic acid, or of a lignosulfonic acid, is added in a minor amount. WO1984004089 relates to setting accelerators comprising calcium nitrate and triethanolamine. However, as a matter of fact, those amine accelerators are hazardous substances that can hardly be used with respect to the environment as well as with respect to the user thereof.

It can be concluded that there remains a need for improving the setting and hardening of cement, mortar or concrete compositions, in particular under cold conditions. Therefore, the goal of this application is to provide accelerators for improving the setting and hardening of cement, mortar or concrete compositions, including at cold temperatures.

A further goal of this application is to improve the setting and hardening of cement, mortar or concrete composition comprising CSMs (cementitious supplementary materials).

SUMMARY OF THE APPLICATION

According to an aspect of the present application, a setting and hardening accelerator for a cement, mortar or concrete composition is disclosed. The accelerator comprises a supernatant comprising an aqueous nitrate solution. The supernatant further comprises a dissolved alkaline hydroxide supernatant solid. The supernatant has a pH of at least 9.0. The accelerator optionally can also comprise a hydroxide precipitate. The advantage of such an alkaline supernatant is that it provides the elevated pH value necessary for the crystallization reactions of cement materials. It is found that the alkaline supernatant accelerates the setting and hardening of cement, mortar or concrete compositions, which is economically interesting. The acceleration is in particular interesting with respect to applications in cold climates where the setting and hardening of cement is slow.

In particular, the setting and hardening accelerator for a cement, mortar or concrete composition according to the present application is an aqueous composition comprising between 30 and 55 w/w %, more in particular between 30 and 50 w/w % of a nitrate salt as a nitrate solution and between 0.02 and 0.1 w/w % of an alkaline hydroxide, which is dissolved in the nitrate solution and, optionally, as a hydroxide precipitate in the accelerator composition, wherein the accelerator composition has a pH of at least 9.0.

In a possible accelerator according to the application, the alkaline hydroxide is selected from calcium hydroxide, sodium hydroxide or potassium hydroxide.

In a possible accelerator according to the application, the aqueous nitrate solution is selected from an aqueous calcium nitrate solution, an aqueous sodium nitrate solution or a, aqueous potassium nitrate solution. Accordingly, in a possible accelerator composition according to the application, the nitrate salt is selected from calcium nitrate, sodium nitrate or potassium nitrate.

In a possible accelerator composition according to the application, the pH of the aqueous composition is between 9.0 and 14.0. In another possible accelerator composition according to the application, the pH of the aqueous composition is between 12.0 and 14.0.

In a possible accelerator according to the application, the supernatant comprises an aqueous nitrate solution that is obtained by dissolving between 30 and 55 w/w %, more in particular between 30 and 50 w/w % of calcium nitrate salt (solid), sodium nitrate salt (solid) or potassium nitrate salt (solid) in water and between 0.02 and 0.1 w/w % of solid calcium hydroxide, solid sodium hydroxide or solid potassium hydroxide that is added to the formed aqueous nitrate solution.

In a possible accelerator according to the application, the supernatant comprises an aqueous calcium nitrate solution that is obtained by dissolving between 44 and 55 w/w % of a calcium nitrate salt in water and between 0.02 and 0.1 w/w % of a solid calcium hydroxide that is added to the formed aqueous calcium nitrate solution which causes the formation of a calcium hydroxide precipitate. Accordingly, a possible accelerator composition according to the application comprises between 44 and 55 w/w % of calcium nitrate as a nitrate solution and between 0.02 and 0.1 w/w % of a calcium hydroxide.

In a possible accelerator according to the application, the supernatant comprises an aqueous calcium nitrate solution that is obtained by dissolving approximately 49.98 w/w % of a calcium nitrate salt in water and by adding approximately 0.04 w/w % of a solid calcium hydroxide to the formed aqueous calcium nitrate solution which causes the formation of a calcium hydroxide precipitate. Accordingly, a possible accelerator composition according to the application comprises approximately 49.98 w/w % of a calcium nitrate salt in water and approximately 0.04 w/w % of calcium hydroxide.

In case the cement, mortar or concrete composition, comprises one or more CSMs, optionally comprising fly ash or lime stone, the pH of the accelerator composition or the supernatant of the accelerator composition is at least 12.0. The advantage of such pH value is that it provides the elevated pH value necessary for the crystallization reactions of not only the cement, mortar or concrete in the composition but also of the CSMs the composition. It is found that at such a pH value, the setting and hardening of the cement, mortar or concrete composition comprising one or more CSMs is accelerated.

A further aspect of the present application provides a cement, mortar or concrete composition comprising an accelerator composition according to the present application. In certain embodiments, a cement, mortar or concrete composition is provided, wherein the cement, mortar or concrete composition comprises one or more cement replacement materials, optionally comprising fly ash or lime stone, and an accelerator composition as described above and having a pH of at least 12.0.

According to a further aspect of the present application, the use of an accelerator composition comprising an aqueous nitrate solution and a dissolved alkaline hydroxide solid and having a pH of at least 9, and optionally comprising a hydroxide precipitate, for setting and hardening acceleration of cement, mortar or concrete composition is disclosed.

More in particular, a supernatant forming part of an accelerator according to the present application as described above is used.

According to a further aspect of the present application, the use of an accelerator composition according to the application and having a pH of at least 12.0, and optionally comprising a hydroxide precipitate, for accelerating the setting and hardening of a cement, mortar or concrete composition comprising one or more CSMs is disclosed.

More in particular, a supernatant forming part of an accelerator according to the present application as described above is used.

According to a further aspect of the present application, a method is disclosed for accelerating the setting and hardening of a cement, mortar or concrete composition, optionally comprising one or more CSMs. The method comprises the steps of producing an accelerator according to the present application as described above, and adding the accelerator to a cement material or one or more CSMs or a coarse aggregate or any combination thereof at a temperature of between 5° C. and 20° C.

In a possible method according to the application, the addition of the cement material or one or more CSMs or a coarse aggregate or any combination thereof is performed at a temperature of approximately 5° C.

According to a further aspect of the present application, a method for producing an accelerator composition as described herein is disclosed, the method comprising the steps of dissolving between 30 and 55 w/w %, more in particular between 30 and 50 w/w % of a nitrate salt, more specifically a calcium nitrate, a sodium nitrate or a potassium nitrate, in water, thereby obtaining an aqueous nitrate solution; and adding between 0.02 and 0.1 w/w % of an alkaline hydroxide, more specifically a solid calcium hydroxide, a solid sodium hydroxide or a solid potassium hydroxide, to the aqueous nitrate solution, thereby obtaining an accelerator composition having a pH of at least 9.0.

DETAILED DESCRIPTION

Figure 1:
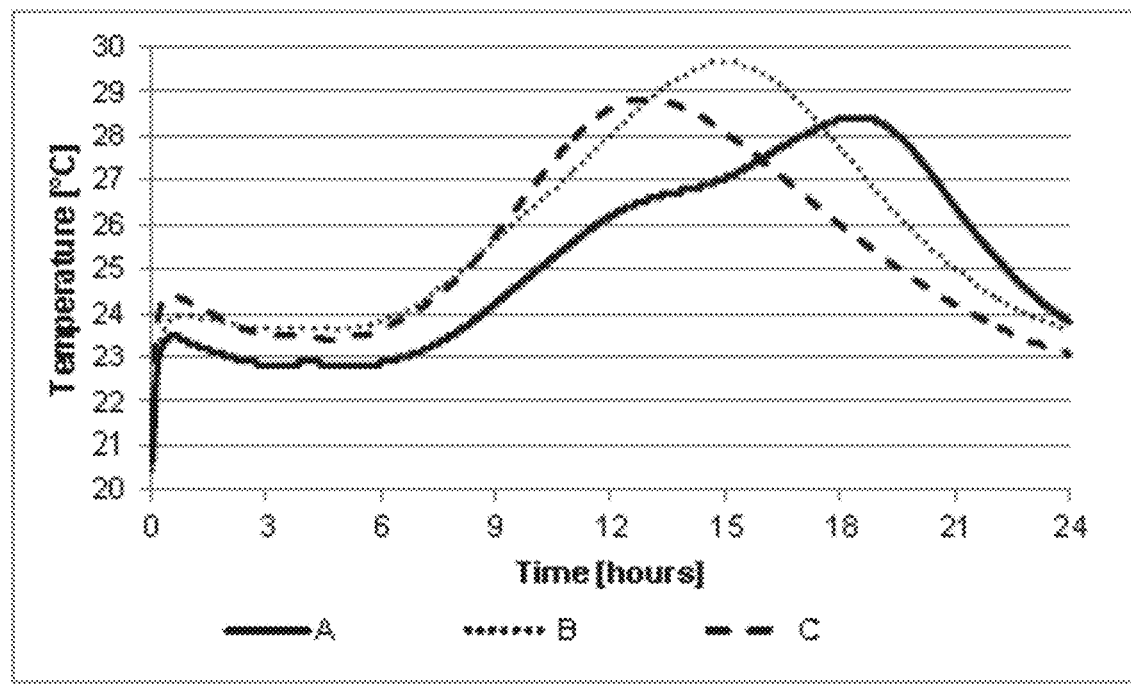
In FIG. 1, hydration curves for samples of cement paste comprising none of, one of or both sodium nitrate and sodium hydroxide are shown.

As defined herein, the singular forms "a", "an", "the" include both the singular and the plural, unless the context clearly indicates otherwise. The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps. All references cited in this description are hereby deemed to be incorporated in their entirety by way of reference.

As used herein, w/w % means the weight percentage. When used in the context of an accelerator composition it means the weight percentage relative to the total weight of the accelerator composition. Accordingly, the expression "dissolving between X % w/w of a nitrate salt in water" means that X weight percent of the nitrate salt (solid) relative to the total weight of the accelerator is dissolved in water. It is also that percentage of the nitrate salt that finally will be present in the accelerator composition. Likewise, the expression "adding X w/w % of an hydroxide solid to the formed nitrate solution" means that X weight percent of hydroxide solid in view of the total weight of the accelerator is added to the formed nitrate solution and is dissolved therein and will finally be present in the accelerator.

The present application relates to a setting and hardening accelerator for a cement, mortar or concrete composition.

Cement is used as a binder material that hardens to form the connecting material between solids. Cements that are used in construction are either hydraulic or non-hydraulic. Hydraulic cements (e.g., Portland cement) harden because of hydration, being a chemical reaction between anhydrous cement powder and water. Consequently, they can harden underwater or when constantly exposed to wet weather. The chemical reaction results in hydrates that are not very water-soluble and so are quite durable in water. Non-hydraulic cements do not harden underwater. Slaked limes for example harden by reaction with atmospheric carbon dioxide.

Portland cement is by far the most common type of cement in general use around the world. This cement is made by heating limestone (calcium carbonate) with small quantities of other materials (such as clay) to a temperature of 1450° C. in a kiln, in a process known as calcination. In a calcination process, a molecule of carbon dioxide is liberated from the calcium carbonate to form calcium oxide, also called quicklime, which is then blended with the other materials that have been included in the mix. The resulting hard substance, called 'clinker', is then ground with a small amount of gypsum into a powder to make 'Ordinary Portland Cement', the most commonly used type of cement (often referred to as OPC).

There exist different types of cement, indicated with CEM I to CEM V, with a lower or higher content of Portland cement and high oven cement such as cement replacement materials, also referred to as cementitious supplementary materials (CSMs) such as lime stone or fly ash, i.e.
CEM I: OPC with maximally 5% of other compounds;
CEM II: all kinds of mixtures of OPC and for instance fly ash, limestone or slate, minimally 65% OPC;
CEM III: high oven/Portland cement mixture in 3 classes: A, B and C, wherein
CEM III/A comprises the lowest (40%) and CEM III/C the highest (60%) amount of blast furnace slag;
CEM IV: types of Pozzolana cement;
CEM V: composite cements, with mixtures of OPC, blast furnace slag and Pozzolana compounds.

The term "cement replacement material(s)" is used herein interchangeably with the term "cementitious supplementary material(s)", abbreviated as CSMs, and generally refers to cementitious materials rich in calcium and/or silicates. In particular, the CSMs are selected from the group consisting of fly ash, lime stone or blast furnace slag. More in particular, the CSMs as envisaged herein do not comprise alumina or aluminate materials, such as fused or tabular alumina, zircon, alumina silicates, etc.

Dry mortar blends are typically made from a mixture of an aggregate such as sand, a binder such as cement or lime, and water. Commonly, a dry mortar blend consists of about 25 w/w % of cement and of about 75 w/w % of sand. Just before use, the dry mortar blend is mixed with water to make a workable mortar paste which is useful as a common construction material to bind construction blocks together and fill the gaps between them. A mortar paste becomes hard when it sets, resulting in a rigid aggregate structure. Mortar can also be used to fix, or point, masonry when the original mortar has washed away. The dry mortar blend is stored dry in bags.

Concrete is a composite construction material composed primarily of aggregate, cement, and water. There are many formulations, which provide varied properties. The aggregate is generally a coarse gravel or crushed rocks such as limestone, or granite, along with a fine aggregate such as sand. The cement, commonly Portland cement, and other cementitious materials such as fly ash and slag cement, serve as a binder for the aggregate. Various chemical admixtures are also added to achieve varied properties. Water is mixed with the dry concrete mixture, which enables it to be shaped (typically poured or casted) and then solidified and hardened (cured, set) into rock-hard strength concrete through a chemical process called hydration. The water reacts with the cement, which bonds the other components together, finally creating a robust stone-like material. Concrete is widely used for making architectural structures, foundations, brick/block walls, pavements, bridges/overpasses, motorways/roads, runways, parking structures, dams, pools/reservoirs, pipes, footings for gates, fences and poles and even boats.

Concrete can be damaged by many processes, such as the freezing of water trapped in the concrete pores. Casting and curing concrete in cold weather, in particular at or below a—sustained—freezing temperature is challenging. The most common problem is that concrete freezes and/or goes through freeze/thaw cycles before acquiring adequate strength during curing. At said cold weather conditions, water starts to freeze in capillaries of concrete at −2° C., it expands up to 9% of its volume when it freezes causing cracks in the concrete matrix, and up to 50% of compressive strength reduction may occur if concrete freezes before reaching at least a compressive strength of 500 psi.

The setting and hardening accelerator according to the present application for a cement, mortar or concrete composition as described in more detail above comprises a supernatant or solution that first of all comprises an aqueous nitrate solution and that furthermore comprises a dissolved alkaline hydroxide solid. Depending on the composition of the aqueous nitrate solution and on the nature of the solid alkaline hydroxide that is dissolved in the supernatant, the accelerator may further comprise a hydroxide precipitate. In particular, calcium hydroxide has a solubility in water of only 1.89 g/L at 0° C. and 1.73 g/L at 20° C. Therefore, precipitation will occur when the amount of calcium hydroxide added or formed under the following procedures exceeds the solubility of calcium hydroxide at the temperature of the supernatant:
 1. calcium hydroxide is added to the aqueous nitrate solution, or
 2. calcium hydroxide is formed through the addition of a solid alkaline hydroxide (e.g. solid sodium or potassium hydroxide) to an aqueous calcium nitrate solution.

Accordingly, the setting and hardening accelerator according to the present application generally comprises an aqueous nitrate solution and an alkaline hydroxide.

Depending on whether the cement, mortar or concrete composition does also or does not comprise one or more CSMs, the accelerator composition, or the supernatant thereof more in particular has a typical pH. If no CSMs are present, the accelerator composition or supernatant has a pH of at least 9.0, while, when CSMs are present, the accelerator composition or supernatant typically has a pH of at least 12.0. As used herein, the "pH" is the conventional unit for hydrogen ion activity in an aqueous solution measured at 25° C. and at 1 atmosphere pressure [i.e. ISO standard state]. A pH of at least 9.0 includes any measured pH value that would be rounded to 9.1 or higher. A pH of at least 12.0 includes any measured pH value that would be rounded to 12.1 or higher. A pH between 9.0 and 14.0 includes any measured pH value between a pH value rounded to 9.1 or higher and a pH value rounded to 14.1 or lower.

More in particular, the aqueous nitrate solution comprised in the accelerator is selected from an aqueous calcium nitrate solution, an aqueous sodium nitrate solution or an aqueous potassium nitrate solution. Most in particular, an aqueous calcium nitrate solution is used. This is due to the fact that calcium nitrate already accelerates by itself the setting and hardening for a cement, mortar or concrete composition due to the fact that it has a pH value of 5 to 8. However, this pH is not yet sufficiently elevated and should typically be at least 9 when no CSMs are included. This pH value can be obtained by adding a solid alkaline hydroxide that is dissolved in the aqueous nitrate solution. The solid alkaline hydroxide is particularly selected from a solid calcium hydroxide, a solid sodium hydroxide or a solid potassium hydroxide. In case no CSMs are present, the pH of the supernatant more in particular is between 9.0 and 14.0, while when CSMs are present, the pH of the supernatant is between 12.0 and 14.0.

The accelerator composition is produced by dissolving between 30 and 55 w/w %, more in particular between 30 and 50 w/w % of a solid calcium nitrate (salt), a solid sodium nitrate (salt) or a solid potassium nitrate (salt) in water, resulting in an aqueous calcium nitrate, sodium nitrate or potassium nitrate solution, and thereafter adding between 0.02 and 0.1 w/w % of a solid calcium hydroxide, a solid sodium hydroxide or a solid potassium hydroxide to the resulting aqueous nitrate solution, resulting in the accelerator composition according to the present invention, wherein the accelerator composition is in the form of a solution/supernatant, or in the form of a solution/supernatant and a precipitate, depending whether or not the solubility of calcium hydroxide has been exceeded. In particular, the accelerator composition is produced by first, producing an aqueous calcium nitrate solution by dissolving between 44 and 55 w/w % of a solid calcium nitrate in water, and thereafter by adding between 0.02 and 0.1 w/w % of solid calcium hydroxide to the resulting aqueous calcium nitrate solution. Most in particular, the accelerator composition is produced by producing an aqueous calcium nitrate solution by dissolving approximately 49.98 w/w % of solid calcium nitrate in water and thereafter dissolving approximately 0.04 w/w % of a solid calcium hydroxide in the form aqueous calcium nitrate solution.

The present application thus provides for an aqueous accelerator composition comprising between 30 and 55 w/w %, more in particular between 30 and 50 w/w % of a nitrate salt in water, more specifically calcium nitrate, sodium nitrate or potassium nitrate in water, and between 0.02 and 0.1 w/w % of an alkaline hydroxide, particularly a hydroxide of an alkali metal or alkaline earth metal, more specifically calcium hydroxide, sodium hydroxide or potassium hydroxide. In particular, the aqueous accelerator composition comprises between 44 and 55 w/w % calcium nitrate in water and between 0.02 and 0.1 w/w % of calcium hydroxide. Even more in particular, the aqueous accelerator composition comprises approximately 49.98 w/w % calcium nitrate in water and approximately 0.04 w/w % calcium hydroxide.

In particular embodiments, the present application provides for an aqueous accelerator composition consisting of (i) between 30 and 55 w/w %, more in particular between 30 and 50 w/w % of a nitrate salt, more specifically calcium nitrate, sodium nitrate or potassium nitrate, (ii) between 0.02 and 0.1 w/w % of an alkaline hydroxide, particularly a hydroxide of an alkali metal or alkaline earth metal, more specifically calcium hydroxide, sodium hydroxide or potassium hydroxide, and (iii) water. In particular, the aqueous accelerator composition consists of between 44 and 55 w/w % calcium nitrate, between 0.02 and 0.1 w/w % of calcium hydroxide and water. Even more specifically, the aqueous accelerator composition consists of approximately 49.98 w/w % calcium nitrate, approximately 0.04 w/w % calcium hydroxide and water.

The application further discloses the use of the accelerator according to the present application and as described above for accelerating the setting and hardening of a cement, mortar or concrete composition. In particular, an accelerator as envisaged herein that comprises a supernatant or solution comprising an aqueous nitrate solution and a dissolved alkaline hydroxide solid, optionally comprising an hydroxide precipitate is used. In case no CSMs are present in the cement, mortar or concrete composition, the accelerator composition has a pH of at least 9.0, while when CSMs are present, the supernatant has a pH of at least 12.0. In case no CSMs are present, the pH of the supernatant more in particular is between 9.0 and 14.0, while when CSMs are present, the pH of the supernatant is between 12.0 and 14.0.

The present application further discloses a method for accelerating the setting and hardening of a cement, mortar or concrete composition, optionally comprising one or more CSMs. The method comprises the steps of producing an accelerator according to this application and of adding the accelerator to a cement material optionally comprising one or more CSMs at a temperature between 5° C. and 20° C. In particular, the addition of the cement material or the one or more CSMs or a coarse aggregate or any combination thereof is performed at a temperature of approximately 5° C.

The present application further discloses a method for producing an accelerator composition according to the present application, comprising the steps of (a) dissolving a nitrate salt, particularly between 30 and 55 w/w %, more in particular between 30 and 50 w/w % of a nitrate salt, more specifically a solid calcium nitrate, a solid sodium nitrate or a solid potassium nitrate, in water, thereby obtaining an aqueous nitrate solution, and (b) adding between 0.02 and 0.1 w/w % of an alkaline hydroxide, more specifically a solid calcium hydroxide, a solid sodium hydroxide or a solid potassium hydroxide, to the aqueous nitrate solution, thereby obtaining an accelerator composition having a pH of at least 9.0.

EXAMPLES

Example 1

In table 1, the composition of three different cement paste samples A, B and C is illustrated. CEM II/A.V 42.5 is a Portland composite cement containing 80-94 w/w % Portland cement clinker, 6-20 w/w % grinded slag and limestone and 0-5 w/w % gypsum and mineral fertilizers. As defined herein, w/c represents the water/cement weight/weight ratio. To prepare the cement paste samples, the cement was mixed with water in the given ratio and thereafter, the admixture that consisted of the indicated weights of solid sodium nitrate ($NaNO_3$) and solid sodium hydroxide (NaOH) was added to this mixture. The obtained paste was subsequently mixed for 60 seconds in a kitchen mixer, scraped from the wall of the bowl with a spatula, and mixed for another 30 seconds. This was performed in order to ensure an even distribution of the water, the cement and the admixture. The obtained paste was filled into 500 ml cubic shaped plastic bottles. The samples were subsequently allowed to settle at 20° C. The hydration activity was measured by recording the temperature using a PT-100 sensor embedded in the cement paste sample.

TABLE 1

| Sample | g CEM II/A-V 42.5 | w/c | g Water | $NaNO_3$ % | g | NaOH g | pH |
|---|---|---|---|---|---|---|---|
| A | 600 | 0.5 | 300 | 0 | 0 | 0 | — |
| B | 1800 | 0.5 | 900 | 3 | 54 | 0 | 7.90 |
| C | 1800 | 0.5 | 900 | 3 | 54 | 11.38 | 13.17 |

FIG. 1 shows the hydration reactivity represented by the hydration temperature. From FIG. 1, it can be concluded that the initial reaction peak is slightly more intense in the presence of sodium nitrate or a combination of sodium nitrate and sodium hydroxide. FIG. 1 also indicates that the setting time is accelerated by about one hour for both sodium nitrate containing samples and that the hardening activity is increased for both sodium nitrate containing samples between 9 and 12 hours after the start of the reaction. The fastest reaction on FIG. 1 is observed for the sample containing both sodium nitrate and sodium hydroxide, after 12 hours, 3 hours earlier than the samples containing sodium nitrate and 6 hours earlier than the sample containing none of sodium nitrate and sodium hydroxide. Finally, the temperature maximum is significantly (about 1° C.) lower for the sample containing both sodium nitrate and sodium hydroxide than for the sample containing sodium nitrate and at the same level as the sample containing none of sodium nitrate and sodium hydroxide. The alkaline sodium nitrate sample therefore acts as a modest setting and hardening accelerator for fly ash cement.

Example 2

In table 2, the composition of 4,500 ml cement paste samples 1-4 for use in hydration tests is illustrated. The cement used in all experiments was CEM II/A.V 42.5 which is a Portland composite cement containing 80-94 w/w % Portland cement clinker, 6-20 w/w % grinded slag and limestone and 0-5 w/w % gypsum and mineral fertilizers. As defined herein, w/c represents the water/cement weight/weight ratio. To prepare the cement paste samples, the cement was mixed with water in the given ratio and thereafter, the indicated weight of the aqueous calcium nitrate solution was added to this mixture. In order to produce samples 3 and 4, solid sodium hydroxide and solid calcium hydroxide were respectively added to the 55% weight aqueous calcium nitrate solution in order to achieve a pH of 10.4, prior to adding it to the cement mixed with water. The paste resulting from the addition of the aqueous calcium nitrate solution to the cement and water mixture was, in all cases, subsequently mixed for 60 seconds in a kitchen mixer, scraped from the wall of the bowl with a spatula, and mixed for another 30 seconds. This was performed in order to ensure an even distribution of the water, the cement and the admixture. The paste was filled into 500 ml cubic shaped plastic bottles. The samples were subsequently allowed to settle at 20° C. The hydration activity was measure by recorded the temperature using a PT-100 sensor embedded in the cement paste sample.

TABLE 2

| Sample no. | w/c | g Water | Weight percentage of cement | g 55% weight aqueous calcium nitrate | Hydroxide |
|---|---|---|---|---|---|
| 1 | 0.50 | 306 | None | None | None |
| 2 | 0.50 | 295 | 1 | 11 | None |
| 3 | 0.50 | 295 | 1 | 11 | Sodium hydroxide, pH 10.4 |
| 4 | 0.50 | 295 | 1 | 11 | Calcium hydroxide, pH 10.4 |

Figure 2:
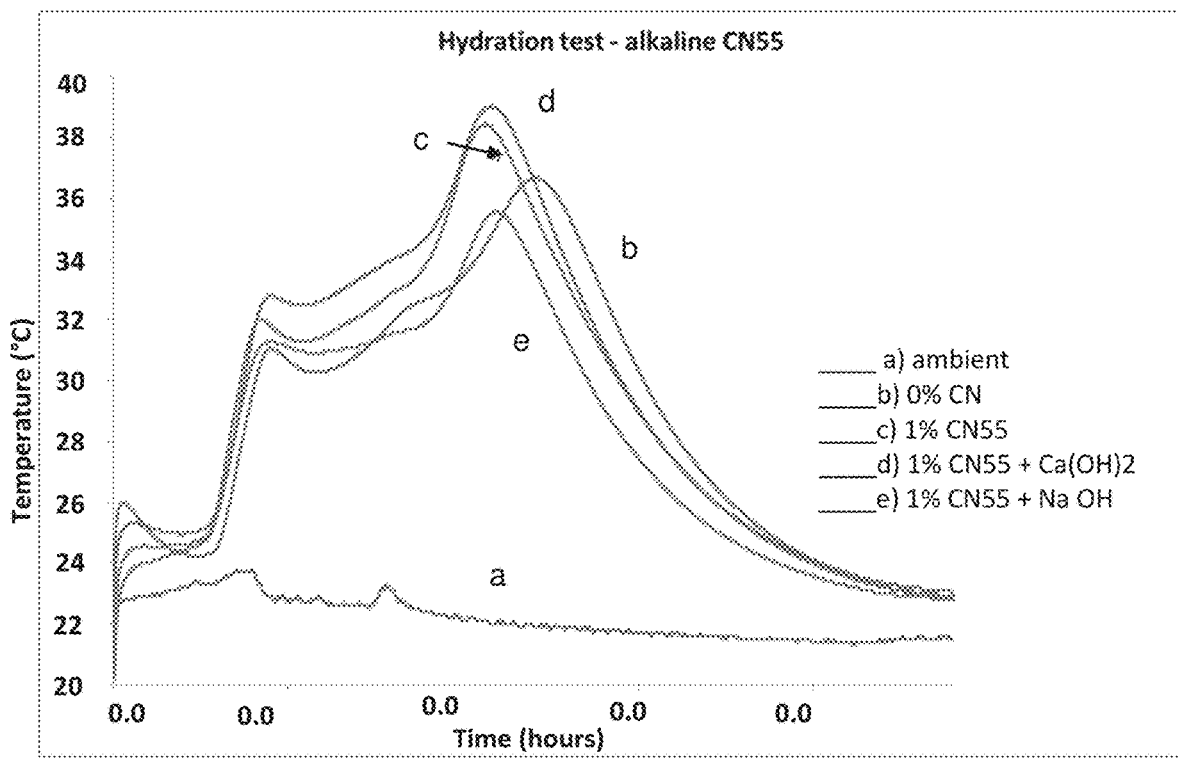
In FIG. 2, hydration curves for samples of cement paste comprising calcium nitrate, a combination of calcium nitrate and sodium hydroxide, or a combination of calcium nitrate and calcium hydroxide are shown; a) ambient; b) 0% CN; c) 1% CNSS; d) 1% CNSS+Ca(OH)$_2$; e) 1% CNSS+ NaOH.

The hydration reactivity as represented by the hydration temperature is presented in FIG. 2. From FIG. 2, it can be concluded that there is higher activity upon use of the calcium hydroxide added calcium nitrate (pH 10.4), compared to the use of calcium nitrate only or sodium hydroxide added calcium nitrate.

Example 3

An aqueous 50 w/w % calcium nitrate solution at a pH of 10.4 was prepared by adding a solid alkaline hydroxide to an aqueous 50 w/w % calcium nitrate solution so as to confer the resulting solution a pH of 10.4. Water, or the aqueous calcium nitrate solutions (50 w/w %), or the aqueous 50 w/w % calcium nitrate at pH 10.4 was added in 2 w/w % to three types of cements mixed with sand, so as to produce w/w sand/cement of 3/1:

I: Portland (OPC)

II—AM: Portland/Pozzolan/Limestone

II—A-LL: Portland/Limestone

Standard sand and cement were mixed with a mortar mixer according to EN 196/1. Setting times were recorded according to EN 480/2.

Figure 3A:
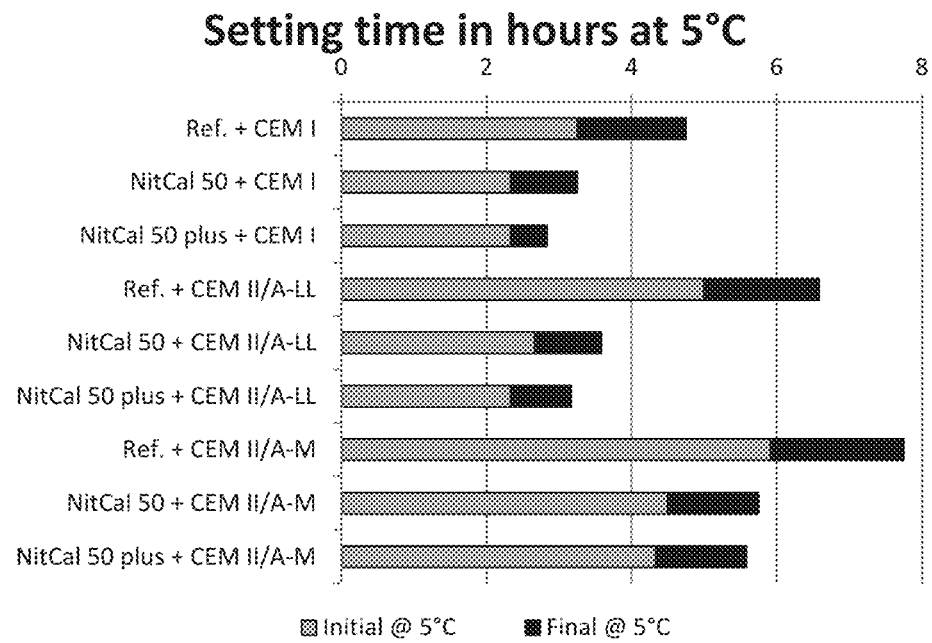
In FIG. 3a, the effect of calcium nitrate and alkaline calcium nitrate on the setting time of various cement and CSMs at 5° C. is shown.
Figure 3B:
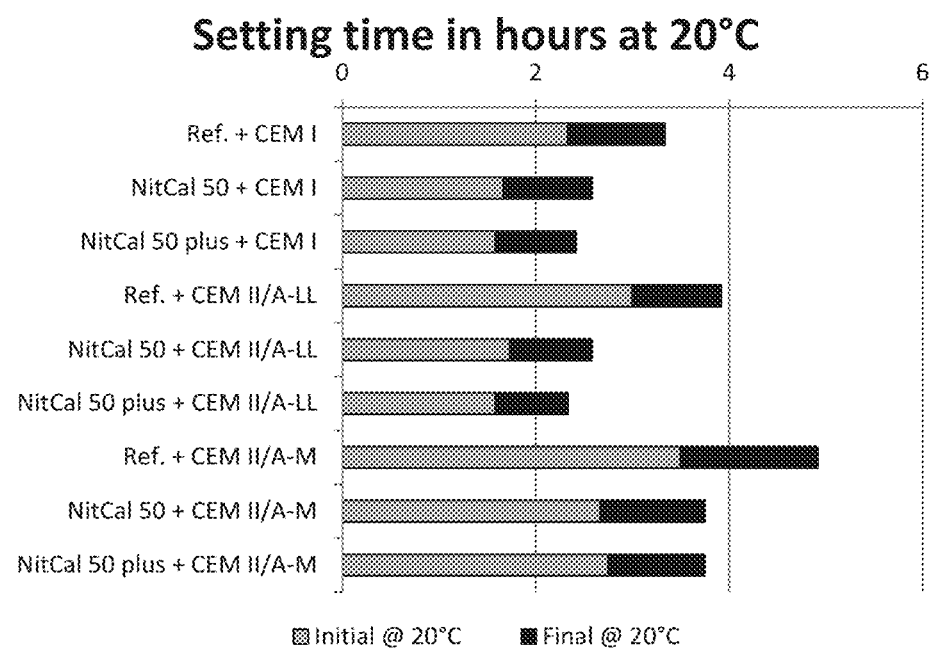
FIG. 3b, the effect of calcium nitrate and alkaline calcium nitrate on the setting time of various cement and CSMs at 20° C. is shown.

The effect of alkaline calcium nitrate of reducing the setting time through immediate sufficiently high pH values is well illustrated by the CEM I results in both FIGS. 3a and 3b. The effect of alkaline CN of reducing the setting time for the cement replacement material due to elevated pH value is illustrated by the CEM II results in both FIGS. 3a and 3b. This further implies that Pozzolan and limestone cement replacement material is activated by an earlier elevated pH value resulting from faster setting Portland cement: alkaline conditions also indirectly, through activation of OPC, further activate CSMs.

Out of the different examples, it can be concluded that it has been found that, when mixing cement with an alkaline accelerator according to the application, the setting time is accelerated with respect to when the cement is mixed with a solution comprising dissolved calcium nitrate only. Furthermore, such improvement has been observed both at a low temperature (FIG. 3a) and at 20° C. (FIG. 3b). In addition, not only has this acceleration of the setting time been observed with OPC (CEM I), it has also been observed with cement mixtures comprising OPC and limestone ("II—A-LL" in FIGS. 3a and 3b) and OPC and limestone and Pozzolan ("II—AM" in FIGS. 3a and 3b). This indicates that an alkaline nitrate solution can not only accelerate the setting time of cement but also that of cement replacement materials. The increase of the cement mixtures comprising OPC and CSMs may further indirectly contribute to the acceleration of the setting of cement replacement materials as the faster hydration of OPC results in an increased pH value resulting in turn in faster hydration of the cement replacement material.

It has further been observed that an alkaline nitrate solution results in faster hydration of cement (FIG. 1) and that the use of calcium hydroxide as the alkaline source results in even faster hydration of the cement compared to the use of sodium hydroxide as the alkaline source (FIG. 2).

The invention claimed is:

1. An accelerator composition for a cement, mortar or concrete composition, the accelerator composition comprising between 30 and 55 w/w % of a nitrate salt as a nitrate solution and between 0.02 and 0.1 w/w % of an alkaline hydroxide, which is dissolved in the nitrate solution and, optionally, as a hydroxide precipitate in the accelerator composition, wherein the accelerator composition has a pH of at least 9.0.

2. The accelerator composition according to claim 1, wherein the alkaline hydroxide is selected from calcium hydroxide, sodium hydroxide or potassium hydroxide.

3. The accelerator composition according to claim 1, wherein the nitrate salt is selected from calcium nitrate, sodium nitrate or potassium nitrate.

4. The accelerator composition according to claim 1, wherein the pH of the accelerator composition is between 9.0 and 14.0.

5. The accelerator composition according to claim 1, comprising between 44 and 55 w/w % of calcium nitrate as a nitrate solution and between 0.02 and 0.1 w/w % of a calcium hydroxide.

6. The accelerator composition according to claim 1, consisting of between 30 and 55 w/w % of a nitrate salt, between 0.02 and 0.1 w/w % of an alkaline hydroxide, and water up to 100 w/w %, wherein the accelerator composition has a pH of at least 9.0.

7. The accelerator composition of claim 5 comprising approximately 49.98 w/w % of calcium nitrate as a nitrate solution and approximately 0.04 w/w % of calcium hydroxide.

8. The accelerator composition of claim 6 consisting of 44 to 55 w/w % of calcium nitrate, 0.02-0.1 w/w % calcium hydroxide; and water up to 100 w/w %.

9. The accelerator composition of claim 8 consisting of approximately 49.98 w/w % calcium nitrate; approximately 0.04 w/w % of calcium hydroxide and water up to 100 w/w %.

10. A method for accelerating the setting and hardening of a cement, mortar or concrete composition, optionally comprising at least one cement replacement materials, wherein the method comprises the steps of:
producing an accelerator composition according to claim 1; and
adding the accelerator composition to the cement, mortar or concrete composition, optionally comprising at least one cement replacement material or a coarse aggregate at a temperature of between 5° C. and 20° C.

11. A method for producing an accelerator composition according to claim 1, comprising:
(a) dissolving between 30 and 55 w/w % of a nitrate salt, in water, thereby obtaining an aqueous nitrate solution;
(b) adding between 0.02 and 0.1 w/w % of an alkaline hydroxide to the aqueous nitrate solution, thereby obtaining an accelerator composition having a pH of at least 9.0.

12. A cement, mortar or concrete composition comprising an accelerator composition comprising between 30 and 55 w/w % of a nitrate salt as a nitrate solution and between 0.02 and 0.1 w/w % of an alkaline hydroxide, which is dissolved in the nitrate solution and, optionally, as a hydroxide precipitate in the accelerator composition, wherein the accelerator composition has a pH of at least 9.0.

13. The cement, mortar or concrete composition according to claim 12, further comprising at least one cement replacement material, optionally comprising fly ash or lime stone, wherein the pH of the accelerator composition is at least 12.0.

* * * * *